No. 742,662. PATENTED OCT. 27, 1903.
E. S. HUTTON.
GLASS BLOWING MACHINE.
APPLICATION FILED OCT. 30, 1902. RENEWED SEPT. 8, 1903.
NO MODEL.
8 SHEETS—SHEET 4.

Fig. 4.

Witnesses
Inventor
Edward S. Hutton
By Edson Bros.
Attorneys

No. 742,662. PATENTED OCT. 27, 1903.
E. S. HUTTON.
GLASS BLOWING MACHINE.
APPLICATION FILED OCT. 30, 1902. RENEWED SEPT. 8, 1903.
NO MODEL. 8 SHEETS—SHEET 5.

Witnesses
Percy C. Bowen
Edwin S. H. Ives, Jr.

Inventor
Edward S. Hutton
By Edson Bro's
Attorneys

No. 742,662. PATENTED OCT. 27, 1903.
E. S. HUTTON.
GLASS BLOWING MACHINE.
APPLICATION FILED OCT. 30, 1902. RENEWED SEPT. 8, 1903.
NO MODEL. 8 SHEETS—SHEET 6.

No. 742,662. PATENTED OCT. 27, 1903.
E. S. HUTTON.
GLASS BLOWING MACHINE.
APPLICATION FILED OCT. 30, 1902. RENEWED SEPT. 8, 1903.
NO MODEL. 8 SHEETS—SHEET 7.

No. 742,662. PATENTED OCT. 27, 1903.
E. S. HUTTON.
GLASS BLOWING MACHINE.
APPLICATION FILED OCT. 30, 1902. RENEWED SEPT. 8, 1903.
NO MODEL. 8 SHEETS—SHEET 8.

No. 742,662.

Patented October 27, 1903.

UNITED STATES PATENT OFFICE.

EDWARD S. HUTTON, OF LAPEL, INDIANA, ASSIGNOR OF ONE-HALF TO ARTHUR WOODWARD, OF LAPEL, INDIANA.

GLASS-BLOWING MACHINE.

SPECIFICATION forming part of Letters Patent No. 742,662, dated October 27, 1903.

Application filed October 30, 1902. Renewed September 8, 1903. Serial No. 172,299. (No model.)

*To all whom it may concern:*

Be it known that I, EDWARD S. HUTTON, a citizen of the United States, residing at Lapel, in the county of Madison and State of Indiana, have invented certain new and useful Improvements in Glass-Blowing Machines; and I do hereby declare the following to be a full, clear, and exact description of the invention, such as will enable others skilled in the art to which it appertains to make and use the same.

My invention relates to improvements in machines for blowing glass jars, bottles, or other hollow ware in which a number of molds are arranged to receive the molten glass and plungers are employed which press the glass into certain parts of the molds, which plungers are provided with openings through which compressed air or other fluid is introduced into the glass to blow the same to the form of the molds.

The construction and arrangement of parts designed to attain the above object will be fully described hereinafter and the points of novelty particularly pointed out in the claims.

Throughout the following specification reference is had to the accompanying drawings, in which the same numerals of reference designate the same parts in the several views, and in which—

The frame of my machine consists of a base-plate 1, having an upright or post 2 at each of its four corners, a tube 3, extending upward from the center, and a top plate 4, supported by the posts 2 and the central tube 3. The posts 2 enter threaded sockets 5, secured to the base-plate and to the top plate, and these posts are tapped with right-hand threads at one end and left-hand threads at the other end, the sockets 5 being correspondingly threaded, so that by turning the posts the distance between the base and the top plate may be adjusted. The central tube 3 is secured at its lower end in a boss 6 on the base-plate 1 and passes through the top plate 4 and a boss 7 thereon, where it is held by a set-screw. By this construction the top plate 4 may be adjusted as to height. A sleeve 8 is fitted over the central tube 3 to turn thereon and is threaded into a boss 9, which forms one member of a ball-bearing, the boss 6 forming the other member thereof, which supports the weight of the sleeve 8 and the parts carried thereby and at the same time allows them to revolve freely around the central tube 3.

Figure 6:
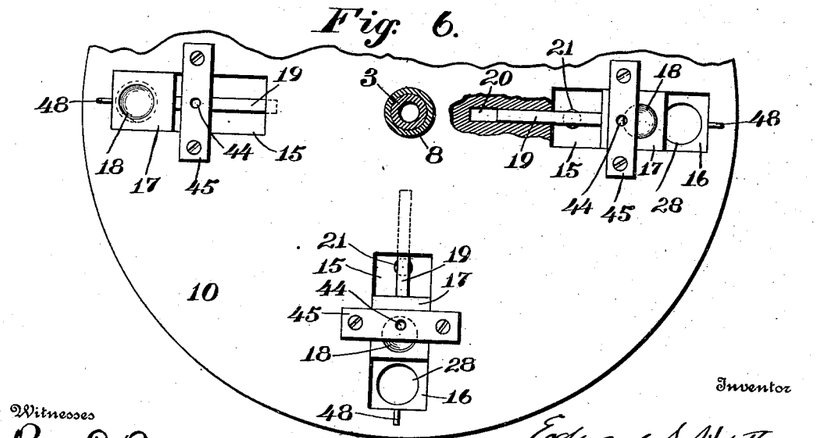
Fig. 6 is a plan of a part of the mold-plate with the molds removed, showing the mold-bottoms and the guiding-slots for the same.
Figures 7, 8, 9:
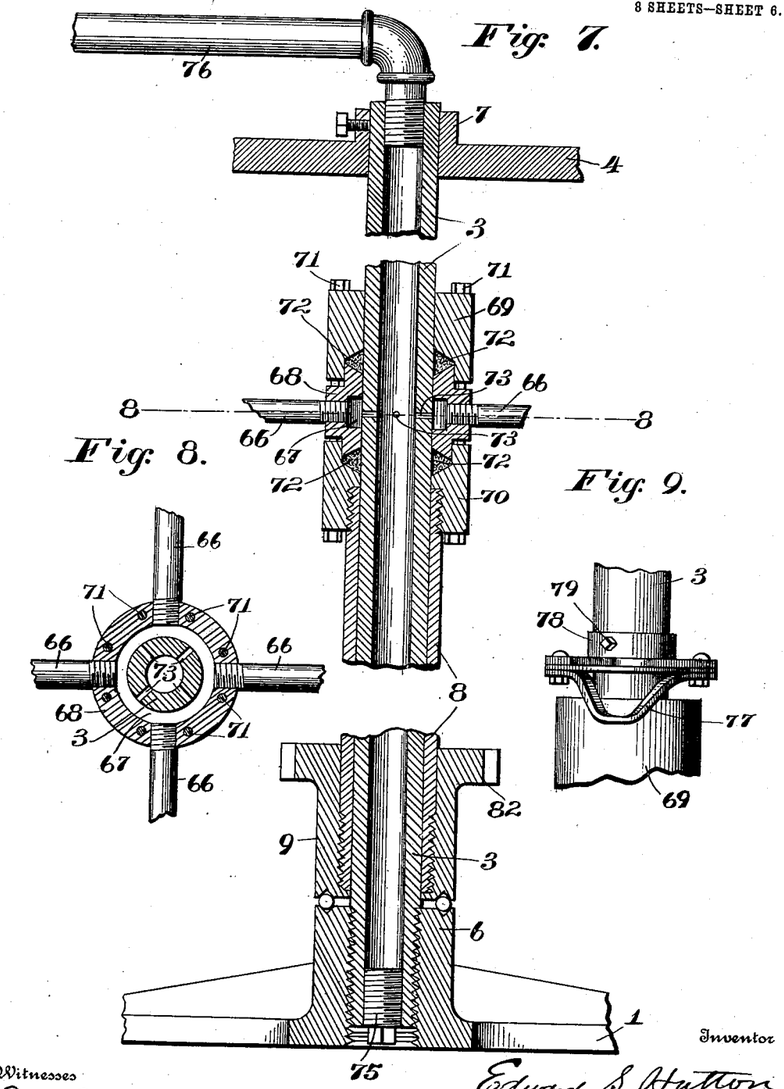
Fig. 7 is a central vertical section through the central tube, the sleeve on the lower part of the same, and other parts connected therewith, showing how the sleeve is mounted on ball-bearings to turn on the base of the machine.
Fig. 8 is a horizontal section taken on the line 8 8 of Fig. 7, showing the collar to which the several pipes are connected and the vents communicating from the interior of the central tube with the fluid-chamber in the collar.
Fig. 9 represents an elevation of the cam for opening the pressure-cocks for admitting the compressed fluid to the plungers.

The mold-plate 10 and the plunger-plate 11 are adjustably secured upon the sleeve 8 by means of bosses 12 and 13, respectively, having lock-screws 14. The mold-plate 10 is provided with a series of slots 15, four of these slots being shown in the drawings, the machine herein shown and described being designed for the use of four molds, although it will be obvious that more or less molds might be used and the several parts of the machine adapted for the use of any desired number. Below each of the slots 15 is secured a plate 16, which forms a bottom for the slot 15 and supports the sliding bottom 17 of the mold, which bottom 17 is free to slide in the slot 15. Each of the sliding bottoms 17 is hollowed out, as at 18, to conform to the proper shape of the bottom of the vessel being formed, and these bottoms are provided with stems 19, which enter holes 20 in the mold-plate 10 and assist in guiding the bottoms 17 in their sliding movement. Rollers 21 are mounted on depending studs 22 on the stems 19 and are arranged to engage cams 23 and 24 on a ring 25, secured by standards 26 to the base 1. The cams 23 and 24 are supported just below the mold-plate 10 and are arranged so that as the plate turns the rollers 21 will be pushed outward by the cam 23 pushing the bottom 17 to the outer end of the slot, as shown on the left-hand side of Fig. 6, and as the rollers pass around to the other side of the machine they will engage the inside of the cam 24, which will withdraw the roller and the bottom 17 to the position shown in the middle slot of Fig. 6.

The plates 16, which form bottoms for the outer ends of the slots 15, are parts of the former-cages 27, which depend from the under side of the plate 10 and have holes 28, through which the formers rise into the molds. The lower parts 29 of the former-cages serve as guides for the former-rods. The formers 30 are fitted to slide vertically in the cages 27 and are cup-shaped at their upper ends, as shown at 31, to receive the molten glass. Rods 32 are screwed into the lower ends of the formers and have at their lower ends rollers 33, journaled in bifurcated castings 34, into which the lower ends of the rods 32 are screwed. By screwing the rods in or out of the formers and castings the height of the formers may be adjusted.

A circular track 35 is secured upon the base 1 and is provided with an inclined portion 36 and a drop 37. The rollers 33 on the former-rods 32 pass successively up the incline 36, thus raising one of the formers at a time above the mold-plate and keeping it elevated until the roller 33 drops from its elevated position at 37. The rods 32 are prevented from turning in the cages 27 by a rod 37$^a$, secured to the casting 34 and extending into an opening in the cage 27. (See Fig. 1.)

The molds 40 are formed of two parts hinged together by pins 41 passing through ears 42 and 43 on the two parts of the molds and extending into holes 44 in flat pieces 45, secured to the top of the mold-plate 10 over the slots 15 and in such position as to cause the vertical center of the molds to coincide with the vertical center of the formers 30. The molds are provided with handles 46, which when the molds are closed are locked together by spring locking-hooks 47. The interior of the molds is of course shaped to conform to the shape of the outside of the vessel to be blown, and in order that they may be closed exactly over the center of the former lugs 48 are provided on the plate 10, and the front parts of the molds are recessed slightly, as at 49, to close over the lugs 48.

The plunger-plate 11 is secured upon the sleeve 8 above the mold-plate 10 and is provided at points exactly over the center of the formers and molds with holes through which the plunger-rods 50 pass. These plunger-rods are guided in guide-sockets 51, secured to the upper side of plate 11, and have at their upper ends rollers 52, journaled in bifurcated castings 53, which castings are screwed on the upper ends of the plunger-rods, so that they will be adjustable thereon. Pivoted on each of the castings 53 is a V-shaped bracket 54, having a roller 55 journaled on each of its upwardly-extending arms, which rollers rest upon the upper side of a circular track 60, supported by hangers 61 from the top plate 4, while the roller 52 travels upon the under side of said track 60, as will be seen in Fig. 1. Around the outer edge of the track 60 is formed an upwardly-extending flange 62 to prevent the rollers 55 from running off of the track, and this track is precipitately curved downwardly, as at 63, dropping from the highest point to the lowest point within a distance of about one-eighth of the circumference of the track, and gradually rises to the highest point throughout the remainder of its circumference.

The plungers 56 are screwed upon the lower ends of the plunger-rods 50, so as to be adjustable thereon, and they are provided with pointed ends 57, which are perforated with small holes 58. The plungers and plunger-rods are hollow, and each rod is connected by a flexible pipe 64 to a pressure-cock 65, which communicates, through a pipe 66, with the fluid-chamber 67 in the collar 68. The collar 68 is fitted on the central tube 3 between two collars 69 and 70, the lower collar 70 being secured to the upper end of the sleeve 8 to turn therewith, and the two collars being drawn together upon the collar 68 by means of the bolts 71, suitable packing 72 being placed between the collars to prevent leakage of the fluid. The annular fluid-chamber 67 in the collar 68 communicates, through the vents 73, with the interior of the central tube 3. The central tube 3 is stopped at one end by a screw-plug 75 and communicates at the other end through a pipe 76 with any suitable source of compressed air or other fluid. Thus the central tube and the fluid-chamber 67 are always filled with fluid under pressure, which the pressure-cocks intermittently shut off from the pipes 64.

A cam 77 is secured to a collar 78, which is secured upon the central tube 3 by means of a set-screw 79, and this cam may be adjusted to such a position that the pressure-cocks will pass under it at a certain point in the revolution of the plunger-plate 11. The pressure-cocks 65 have the usual levers 80, which in this instance are provided with rollers 81, and the cam 77 is so placed that as the pressure-cocks pass under it the lever of each cock will be depressed, thus opening the cock and allowing the fluid under pressure to pass through the pipes 64, the plunger-rods 50, and the plungers 56.

Figure 1:
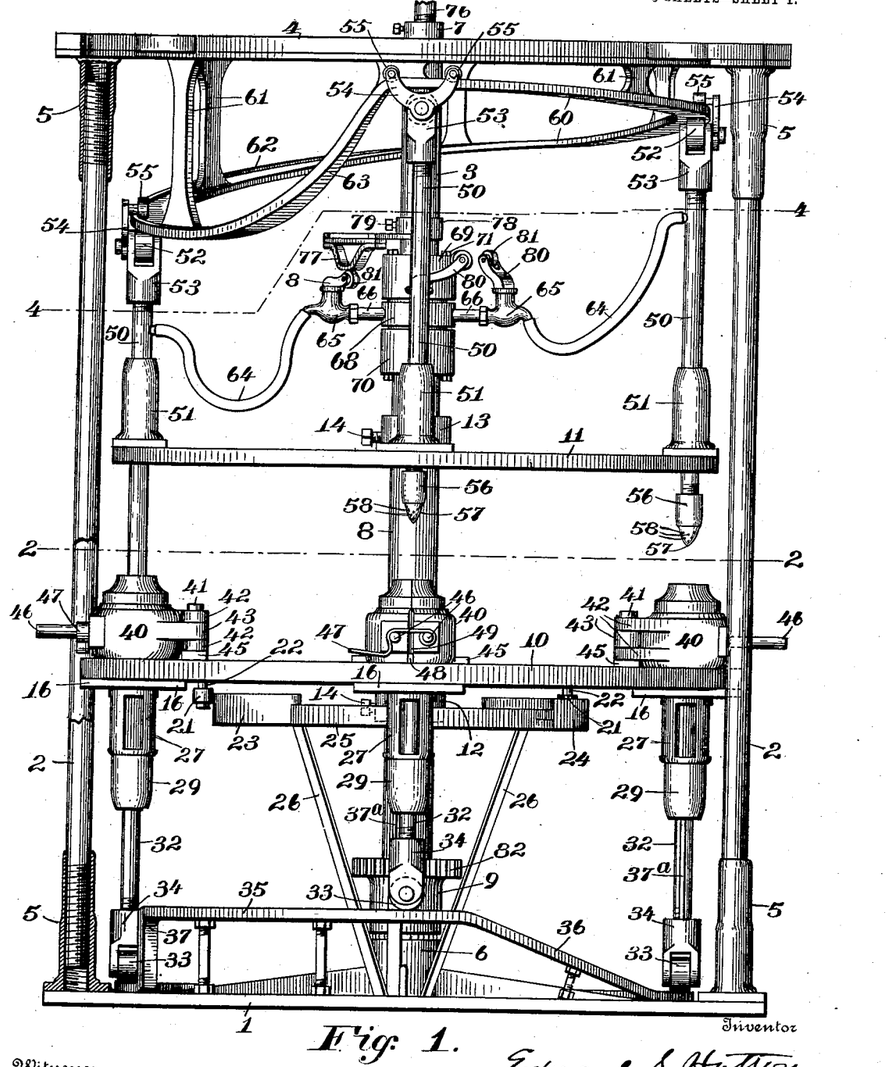
Figure 1 represents an elevation of my improved machine looking at the side which may be termed the "front" thereof, the central mold being in position to receive the molten glass.
Figure 2:
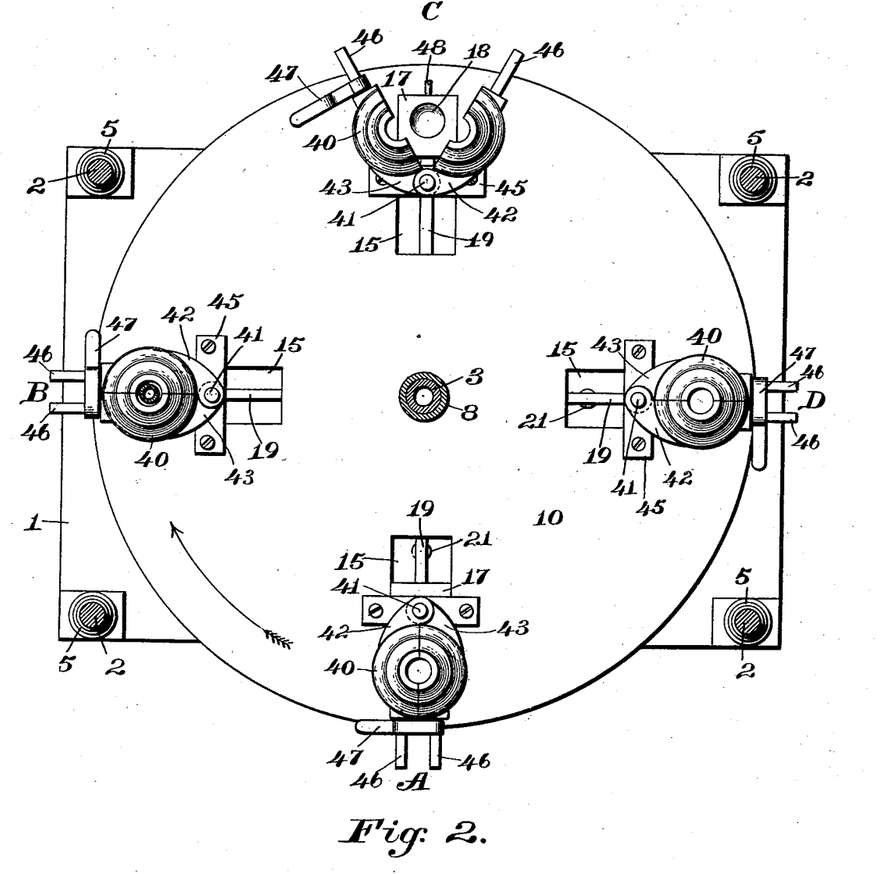
Fig. 2 represents a horizontal section taken on the line 2 2 of Fig. 1, showing the mold-plate in plan and the mold at the rear side of the machine open.
Figures 3, 18:
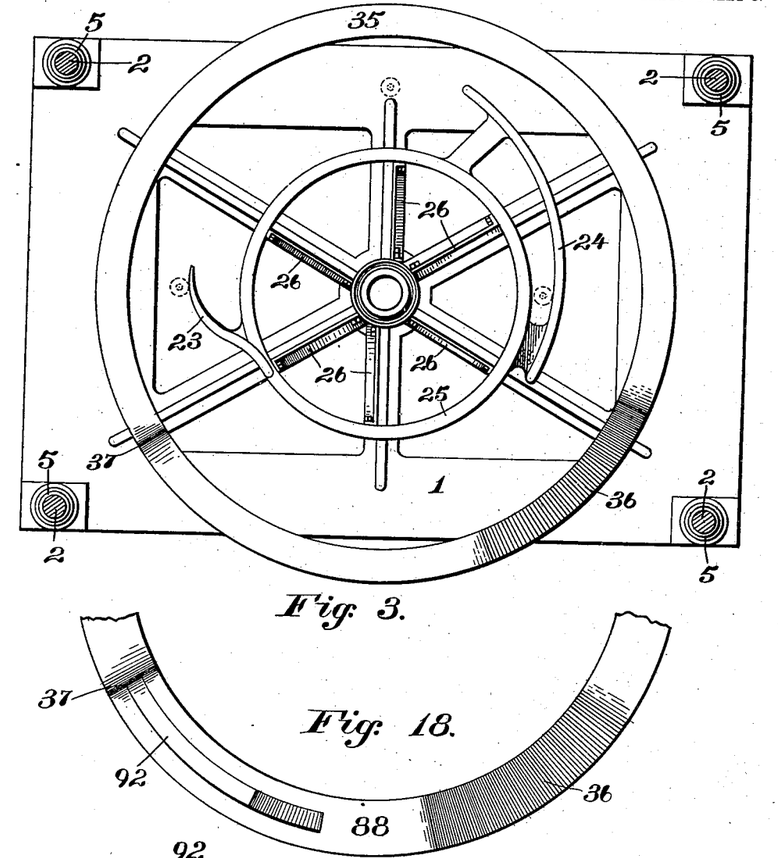
Fig. 3 is a plan of the base of the machine, showing the circular track for operating the formers and the cams for operating the bottoms of the molds.
Fig. 18 is a plan of a part of the modified form of track for use with the form of mold shown in Figs. 13, 14, and 15.
Figure 4:
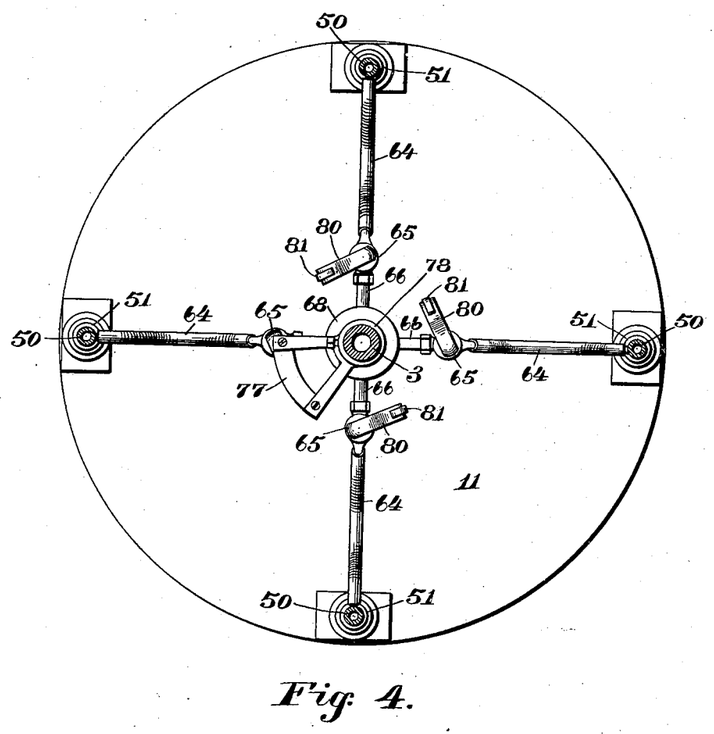
Fig. 4 is a similar view of the plunger-plate, the plungers and the central tube being cut in section on the line 4 4 of Fig. 1.
Figure 5:
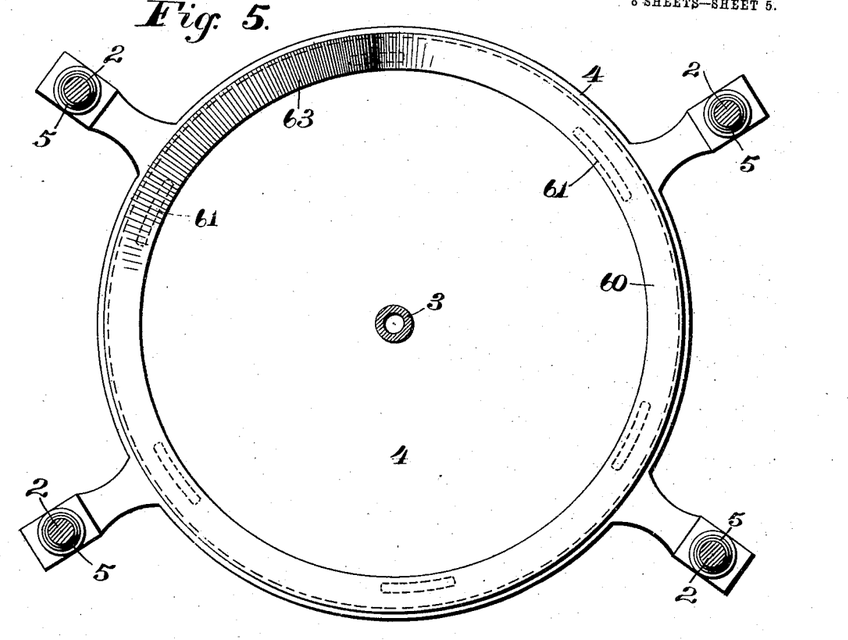
Fig. 5 is an inverted plan of the top plate of the machine and the circular track for operating the plungers.
Figure 10:
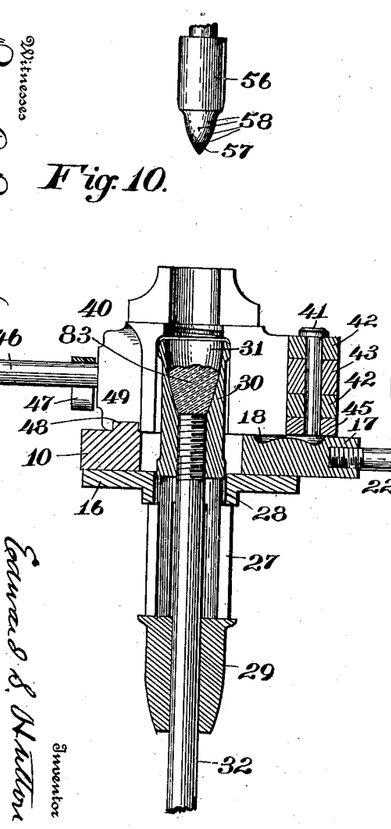
Fig. 10 represents a section through a part of the mold-plate, the mold, the former, and the former-cage, the section through the mold before-mentioned, the section through the mold before-former-cage, the section through the mold before-former-cage, the section through the mold before-ing along the line on which it opens, showing the parts in the position they occupy just after the former has received a charge of molten glass.
Figure 11:
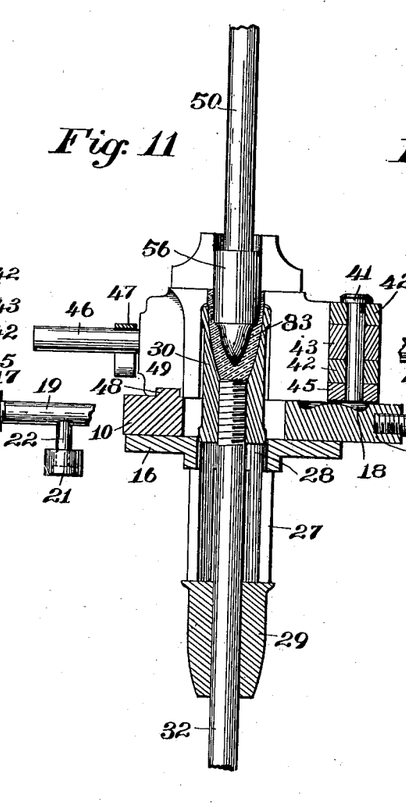
Fig. 11 is a similar section showing the parts just after the plunger has descended into the molten glass, forcing the latter into the neck of the mold.
Figure 12:
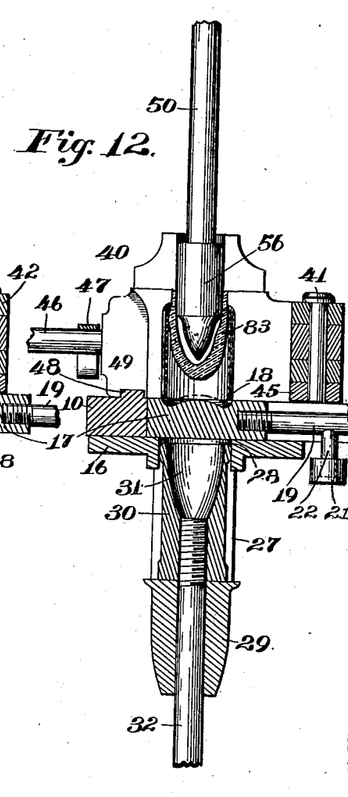
Fig. 12 is a similar section showing the parts after the former has fallen out of the mold and the bottom has moved into place, with the parison or blank of glass hanging in the neck of the mold ready for blowing.

The operation of the machine is as follows: The sleeve 8, the mold-plate 10, the plunger-plate 11, and the collars 68, 69, and 70 are rotated by any suitable motive power, which may be applied to the toothed wheel 82 on the boss 9 of the sleeve 8 and which may be arranged to impart an intermittent rotary motion to these several parts, allowing the parts to stop for a few seconds each time the molds arrive at the position shown in Figs. 1 and 2, which they will do four times in each revolution. When the parts are in the position shown in Figs. 1 and 2, the front mold in the position marked A is closed, the former 30 being raised into the mold, as shown in Fig. 10, and the plunger 56 being elevated to its highest position above the mold, as shown in Fig. 1. At this time the proper quantity of molten glass is poured through the top of the mold into the former, which receives and holds it, as shown at 83 in Fig. 10. As the parts revolve in the direction of the arrow in Fig. 2 the rollers on the upper end of the plunger-rod 50 will descend the incline 63 of the track 60, forcing the plunger down into the molten glass 83 and the glass up into the neck of the mold, as shown in Fig. 11, thus forming the neck of the vessel. As the parts continue to revolve, the plunger begins to rise as its rollers start up the incline of the track 60, and at this time the roller 33 on the former-rod 32 passes off of the drop 37 of the track 35, allowing the former to fall within the cage 27 below the plate 10 and leaving the parison or blank of glass 83 hanging in the neck of the mold. At this time the roller 21 connected with the bottom 17 of this particular mold engages the cam 23 and is pushed outwardly thereby, bringing the bottom 17 beneath the mold in which said parison or blank of glass is hanging, as shown in Fig. 12. Just after this has taken place, the pressure-cock 65, communicating with the plunger in this mold, passes under the cam 77, by which it is opened, allowing the fluid under pressure to pass through the perforations 58 into said parison or blank of glass and blow the latter into the form shown by dotted lines in Fig. 12, thus completing the formation of the vessel in one quarter-turn of the mold-plate and bringing this mold to the position B and the next mold to the position A, where it receives its charge of molten glass. During the next quarter-turn the glass vessel in the first mold is cooling and the plunger 56 is being withdrawn therefrom, while the glass in the next mold is passing through a like process as just described. When the mold reaches the position C, it is opened by hand and the vessel is removed in any suitable manner, after which the mold is closed. After the mold leaves the position C the roller 21 connected with the bottom thereof engages the inside of the can 24, by which the bottom 17 is withdrawn, leaving the opening 28 clear. As the mold passes from the position D to the position A the roller 33 on the lower end of the former-rod 32 passes up the inclined portion 36 of the track 35, thus raising the former into the mold in position for receiving another charge of glass, the plunger 56 having arrived at the highest part of the track 60. The process is the same for each of the molds.

Figures 13, 14, 15, 16, 17:
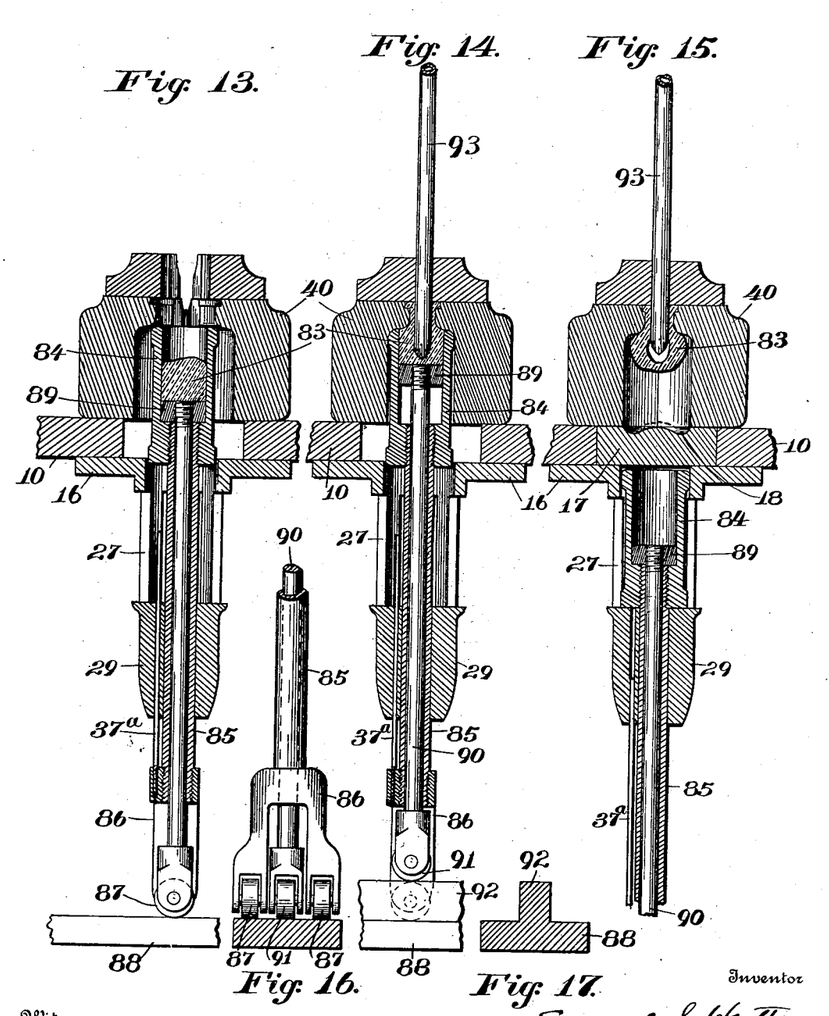
Figs. 13, 14, and 15 represent sectional views showing a modified form of mold and former designed for use in blowing hollow ware or vessels having narrow necks, these views showing the steps answering to three steps in the process as disclosed by Views 10, 11, and 12.
Fig. 16 represents an elevation of the rollers on the lower end of the former-support looking toward the left at the lower part of Fig. 13.
Fig. 17 is a cross-section through the part of the track shown in Fig. 14.
Figure 19:
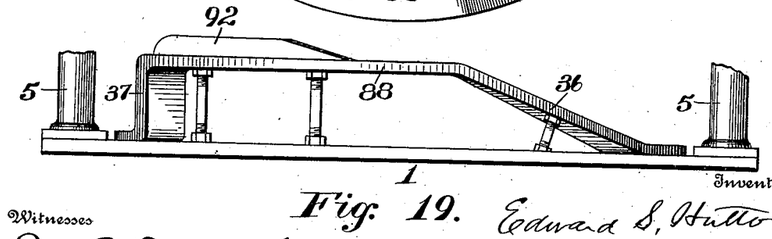
Fig. 19 is a front elevation of the same.

In Figs. 13 to 19 I have shown a slight modification of the mold, plunger, former, and track designed for forming hollow ware having narrow necks. In this class of ware the neck of the mold is so small that it would be difficult to pour the glass in while the mold is closed, and the plunger must be small enough to pass through the narrow neck of the finished vessel, in which case with the former previously described it would not displace sufficient glass to fill the neck of the mold. In this modification the former 84 is cylindrical and supported on a tube 85, on the lower end of which is a bifurcated casting 86, having two rollers 87, which travel on a wide track 88. Within the cylindrical former 84 is fitted a piston 89, having a rod 90, which passes through the tube 85 and has a roller 91 on its lower end, which travels on the track 88 between the two rollers 87. The track 88, as shown in Figs. 16 to 19, is wider than the track 35 and has an upwardly-inclined part 36 and a drop 37 corresponding to the same parts on the track 35, and it also has a central rib 92 rising above the highest part and dropping with the drop 37. This rib is so situated that the central roller 91 will roll upon it as the plunger 93 descends into the glass, thus raising the piston 89 and with it the charge of molten glass, forcing the latter up around the plunger into the neck of the mold, as seen in Fig. 14. The plunger in this instance consists of a tube 93, pointed at the lower end and perforated to allow the air to pass through. In Figs. 13, 14, and 15 the sections are taken at right angles to the sections shown in Figs. 10, 11, and 12; but otherwise the views correspond and show the same steps in the process. Fig. 13 shows the mold slightly open to enable the molten glass to be poured into the former, the mold then being closed and the piston in the former rising, lifting the glass as the plunger descends and forcing the glass into the neck of the mold, as shown in Fig. 14, when the rollers 87 and 91 pass off of the drop 37, the former drops out of the mold, and the bottom is pushed into place by the cam 23, as before, the parison or blank of glass hanging in the neck of the mold, as shown in Fig. 15. The fluid under pressure is then admitted to the plunger and passing through the perforations blows the vessel to the form shown in dotted lines. The remaining operations are exactly the same as described hereinbefore.

Herein I have described a preferred construction for carrying out my invention; but I am fully aware that changes in such construction, combination, and arrangement of parts may be made without in any way departing from the spirit of my invention or sacrificing the advantages thereof, and I therefore reserve the right to make such changes as fairly fall within the scope of my invention.

Having thus described my invention, what I claim, and desire to secure by Letters Patent, is—

1. In a glass-blowing machine, the combination of a central tube containing fluid under pressure, plates mounted rotatably with relation to said tube, molds arranged upon one of said plates, hollow plungers adapted to enter said molds and guided by the other of said plates, means for conducting the fluid from the central tube to said plungers, means for opening and closing the communication from said tube to said plungers, and means for automatically actuating said plungers.

2. In a glass-blowing machine, the combination of a central tube containing fluid under pressure, plates mounted rotatably with relation to said tube, molds arranged upon one of said plates, hollow plungers guided by the other of said plates and adapted to enter said molds, pipes communicating with said plungers and with said central tube, means for controlling the flow of fluid from said tube to said plungers, and means for automatically actuating said plungers.

3. In a glass-blowing machine, the combination of a central tube containing fluid under pressure, plates mounted rotatably with relation to said tube, a collar mounted to rotate on said tube and having a chamber communicating with the interior of said tube, molds arranged upon one of said plates, hollow plungers adapted to enter said molds and guided by the other of said plates, pipes communicating from the chamber in said collar to said plungers, means for controlling the flow of fluid through said pipes, and means for automatically actuating said plungers.

4. In a glass-blowing machine, the combination of a central tube, plates mounted rotatably with relation to said tube, molds arranged upon one of said plates, plungers guided in the other of said plates, and means for automatically causing said plungers to enter and leave said molds at a certain part of their revolution.

5. In a glass-blowing machine, the combination of a series of molds, a central tube containing fluid under pressure, plates mounted rotatably with relation to said tube, a series of plungers suspended above said molds and guided by one of said plates, the other of said plates serving to support said molds, and means for automatically causing said plungers to descend into, and rise out of, said molds at a certain part of each revolution.

6. In a glass-blowing machine, the combination of a fluid-pressure tube, plates mounted rotatably with relation to said tube; series of molds carried by one of said plates, a stationary track having a steep downwardly-inclined portion and a gradually-ascending portion, plungers guided in the other of said plates and suspended above said molds, and rollers on said plungers adapted to roll on said track, whereby the plungers are caused to enter said molds when the rollers pass down the steep inclined portion of the track, and to rise out of said molds as said rollers ascend the gradually-inclined portion of the track.

7. In a glass-blowing machine, the combination of a central tube; a sleeve mounted to turn on said tube, plates carried by said sleeve, molds arranged upon one of said plates, plungers suspended above said molds and guided in the other one of said plates and means for automatically causing said plungers to descend into said molds and to rise therefrom.

8. In a glass-blowing machine, the combination with a central tube; of a sleeve mounted to turn on said tube, plates on said sleeve, molds on one of said plates, plungers guided in the other plate above said molds, and means for automatically causing said plungers to descend into said molds and to rise therefrom.

9. In a glass-blowing machine, the combination with a central tube containing fluid under pressure; of a sleeve mounted to turn on said tube, plates carried by said sleeve and adapted to rotate therewith, molds on one of said plates, hollow plungers guided in the other plate above said molds, pipes communicating from said hollow plungers to said central tube, means for controlling the flow of fluid to said plungers, and means for causing said plungers to descend into said molds and to rise therefrom.

10. In a glass-blowing machine, the combination with a central tube containing fluid under pressure; of a sleeve mounted to turn on said tube, plates carried by said sleeve and adapted to rotate therewith, molds on one of said plates, hollow plungers guided in the other plate above said molds, pipes communicating from said hollow plungers to said central tube, pressure-cocks in said pipes, a cam on said central tube adapted to open said pressure-cocks at a certain time in their revolution, and means for causing said plungers to descend into and rise out of said molds.

11. In a glass-blowing machine, the combination with a central tube containing fluid under pressure; of a sleeve mounted to turn on said tube, plates carried by said sleeve and adapted to rotate therewith, molds on one of said plates, hollow plungers guided in the other plate above said molds, pipes communicating from said hollow plungers to said central tube, means for controlling the flow of fluid to said plungers, rollers on the upper ends of said plungers, and a track on which the said rollers travel, said track having a steep downwardly-inclined portion and a gradually-rising portion whereby said plungers are caused to descend quickly into said molds and to rise slowly therefrom.

12. In a glass-blowing machine, the combination with a series of molds, a central tube containing fluid under pressure, a sleeve mounted to turn on said tube, plates carried by said sleeve and adapted to rotate therewith, said molds arranged on one of said plates, hollow formers below said molds, means for causing said formers to rise into said molds and to fall therefrom; of a series of plungers suspended above said molds and guided in the other of said plates and means for causing said plungers to descend into said molds and formers while the latter are in the molds, and to rise from said molds after said formers have fallen.

13. In a glass-blowing machine, the combination with a series of molds, formers below said molds and means for causing said formers to rise into said molds and to fall therefrom, of a series of hollow plungers above said molds, means for causing said plungers to descend into said molds and formers, and to rise therefrom, and means for admitting fluid under pressure through said plungers into said molds.

14. In a glass-blowing machine, the combination with a revoluble mold-plate having slots therein, bottoms for molds adapted to slide in said slots, molds on said mold-plate above said slots, cam and roller mechanism adapted to directly effect the movement of said bottoms beneath and from under said molds, formers suspended below said mold-plate and means for causing said formers to rise through said slots into said molds and to fall therefrom.

15. In a glass-blowing machine, the combination with a revoluble mold-plate having openings therethrough, bottoms for molds adapted to slide in said openings, cam and roller mechanism adapted to effect the movement of said bottoms beneath and from under said molds, molds upon said plate above said openings; of formers suspended from said plate below said openings, rods depending from said formers and having rollers at their lower ends, a track on which said rollers are adapted to travel, said track having an upwardly-inclined part causing the formers to rise into the molds and a drop portion allowing said formers to fall from the molds.

16. In a glass-blowing machine, the combination with a revoluble mold-plate having slots therein, molds upon said plate above said slots, bottoms for the molds adapted to slide in the said slots, and having guide-stems, rollers on said guide-stems depending below said mold-plate, a cam below said mold-plate adapted to engage said rollers and force the bottoms to the outer ends of the slots, and a cam on the opposite side of the machine adapted to engage the rollers and withdraw the bottoms of the molds from the outer end of the slots; of formers suspended from the mold-plate below the outer ends of the slots and means for causing said formers to rise through the slots into the molds when the bottoms are withdrawn, and to fall out of the molds before the bottoms pass under them.

17. In a glass-blowing machine, the combination with a central tube containing fluid under pressure, a sleeve mounted to turn on said central tube, a mold-plate and a plunger-plate carried by said sleeve to revolve therewith, the mold-plate having slots therein, molds upon the mold-plate above said slots, bottoms for the molds adapted to slide in said slots, and means for sliding said bottoms beneath said molds and withdrawing them therefrom, formers suspended from said mold-plate below said slots, and means for causing said formers to rise within said molds and allowing them to drop out of said molds; of hollow plungers passing through said plunger-plate and suspended above said molds, a collar mounted to turn on the central tube and having a chamber communicating with the interior of said tube; of pipes communicating from the said collar with the said hollow plungers, cocks in said pipes and means for opening and closing said cocks, and means for causing said plungers to descend into and rise out of the molds.

18. In a glass-blowing machine, the combination with a frame, consisting of a base and a top plate, uprights from said base supporting said top plate, said uprights having right-hand screw-threads at one end and left-hand screw-threads at the other end, sockets on the base and top plate threaded to receive the ends of said uprights, whereby the distance between the said base and top plate may be varied by turning said uprights, and a central tube containing fluid under pressure; of molds revolubly mounted on said central tube, hollow plungers also revolubly mounted on said central tube above said molds and means for causing said plungers to descend into said molds and to rise therefrom, pipes communicating from the central tube to the said plunger, and means for controlling the flow of fluid through said pipes.

19. In a machine of the character described, the combination with a central tube containing fluid under pressure, plates carried by said tube, molds arranged upon one of said plates, formers arranged below said latter plate and molds, a cam-track adapted to provide for the raising and lowering of said formers into and out of said molds, hollow plungers guided in the other of said plates and adapted to engage said molds, a cam-track arranged above and adapted to raise and lower said hollow plungers, a cam fixed with relation to said central tube, means for conducting air under pressure from said central tube to said plungers, and valves for controlling the passage of said air, engaged by said cam.

20. In a machine of the character described, the combination of an air-pressure tube, a sleeve mounted to turn on said tube, plates carried by said sleeve, one of said plates carrying molds, formers adapted to enter said molds, a cam-track adapted to raise and lower said formers, movable bottoms or slides arranged intermediately of said molds and formers, cams adapted to actuate said slides, hollow plungers guided in the other of said plates, a cam-track adapted to raise and lower said hollow plungers into and out of said molds, means for effecting the passage of air under pressure from said tube to said hollow plungers, valves for controlling such passage of air, a cam fixed with relation to said tube and adapted to engage said valves.

21. In a machine of the character described, the combination of a pressure-containing tube, a sleeve mounted to turn on said tube, plates carried by said sleeve, molds arranged upon one of said plates, formers arranged below the latter plate and molds, a cam-track adapted to raise and lower said formers, slides or bottoms arranged in said plate intermediately of said molds and formers, cams arranged below said latter plate, pendent rollers connected to said slides or bottoms and adapted to be engaged by said cam, hollow plungers guided in the other of said plates and adapted to engage said molds, a second cam-track adapted to raise and lower said hollow plungers, means for effecting the passage of air under pressure from said tube to said hollow plungers, valves for controlling such passage of air, and a cam having fixed relation to said tube and actuating said valves.

22. In a machine of the character described, the combination of an air-pressure tube, a sleeve mounted to turn on said tube, plates carried by said sleeve, molds arranged upon one of said plates, formers arranged below the other of said plates and adapted to operate in conjunction with said molds, a cam-track adapted to raise and lower said formers, slides or bottoms arranged in one of said plates, intermediately of said molds and formers, a cam arranged below said latter plate, and means interposed between said slides and cam to provide for the actuation of said slides thereby, hollow plungers guided in the other of said plates and adapted to engage said molds, a second cam-track arranged above said plungers, trucks or rollers connected to said plungers, adapted to travel upon the latter-referred-to cam-track, means for effecting the passage of air under pressure from said tube to said hollow plungers, valves for controlling such passage of air, and a cam having fixed relation to said tube and adapted to engage said valves.

In testimony whereof I affix my signature in presence of two witnesses.

EDWARD S. HUTTON.

Witnesses:
HARVEY G. RALYA,
WIRT BATES.